United States Patent [19]
Böckmann et al.

[11] Patent Number: 6,145,399
[45] Date of Patent: Nov. 14, 2000

[54] INDICATOR FOR A SHIFT BY WIRE VEHICLE TRANSMISSION

[75] Inventors: Gerhard Böckmann, Laatzen; Andreas Böhm, Wennigsen, both of Germany

[73] Assignee: Wabco GmbH & Co. OHG, Hannover, Germany

[21] Appl. No.: 09/268,371

[22] Filed: Mar. 15, 1999

Related U.S. Application Data

[60] Provisional application No. 60/078,339, Mar. 17, 1998.

[51] Int. Cl.[7] .................................................... B60K 41/10
[52] U.S. Cl. ............................. 74/335; 477/124; 701/52
[58] Field of Search ............................. 74/335; 477/906, 477/907; 701/52, 64

[56] References Cited

U.S. PATENT DOCUMENTS

| | | | |
|---|---|---|---|
| 4,561,055 | 12/1985 | McKee | 701/52 |
| 5,050,079 | 9/1991 | Steeby | 74/335 X |
| 5,089,965 | 2/1992 | Braun | 701/52 |
| 5,436,833 | 7/1995 | Janecke | 74/335 X |
| 5,498,195 | 3/1996 | White et al. | 701/64 X |
| 5,609,548 | 3/1997 | White et al. | 477/906 X |
| 5,638,271 | 6/1997 | White et al. | 701/64 |
| 5,875,409 | 2/1999 | Steeby et al. | 74/335 X |

*Primary Examiner*—Khoi Q. Ta
*Attorney, Agent, or Firm*—Proskauer Rose LLP

[57] ABSTRACT

Non-synchronized, manually shiftable transmissions of modern vehicle types are actuated by means of an automated transmission control, and the driver can optionally select any gear by means of an actuator which is electrically connected to the transmission control device. In general terms, the method of this invention includes the operator generating a signal indicating a desire to shift the transmission. The transmission then automatically begins implementing the shift. If the currently engaged gear is not disengaged within a preselected time period, because the system cannot achieve a break torque condition, for example, the system signals the driver to manually operate the clutch. A visual and audible signal preferably are provided to the driver. Once the driver manually operates the clutch, the system is able to complete the desired shift.

7 Claims, 2 Drawing Sheets

INDICATOR FOR A SHIFT BY WIRE VEHICLE TRANSMISSION

This application claims priority from U.S. Provisional Patent Application Ser. No. 60/078,339, filed on Mar. 17, 1998.

BACKGROUND OF THE INVENTION

This application describes some subject matter which is in common with U.S. patent application Ser. No. 09/268,370, filed on even date herewith.

This invention generally relates to control methods useful with heavy duty vehicle transmissions that allow a driver to manually select an automatically implemented shift.

Heavy duty vehicles such as trucks typically include a multi-speed transmission that is manually controlled by the driver. The driver utilizes a manual stick shift and clutch to select one of several transmission gears depending upon the driving conditions, for example. The manual stick shift allows the driver to select from the various transmission gears, which vary the ratio between the input speeds of the transmission from the engine and the output speed of the transmission. Conventional shifting operations are typically difficult and cumbersome. They often require a high level of skill from the driver. As trucks have become more complex, the difficulties in shifting the transmission have also increased.

More recently, systems have been proposed to simplify the task of shifting the transmission. Such systems allow a driver to move a shift lever in one of two directions or to push buttons to indicate a desired shift. An electronic controller determines the desired gear ratio and operates an automatic shifting module to change the transmission into the desired gear ratio. Such systems have advantages in that they can simplify the task of driving a heavy duty vehicle.

The nature of a transmission associated with a heavy duty vehicle requires a variety of controlling strategies that must be implemented by the electronic controller to effect appropriate transmission operation. One situation where this is true is providing appropriate feedback to the driver of the vehicle regarding the status or condition of the transmission. This invention includes a method of providing the driver an indication of when the driver needs to take action such as manual clutch operation to ensure that the transmission is engaged into a desired gear. This invention also addresses the situations where a new gear must be engaged after the vehicle has been stopped or was coasting.

SUMMARY OF THE INVENTION

This invention includes methods of controlling a semi-automatic vehicle transmission. The disclosed implementations of the methods of this invention are especially useful for controlling the vehicle transmission after the vehicle has been stopped or when a shift cannot be automatically completed.

In general terms, the method of this invention includes the operator generating a signal indicating a desire to shift the transmission. The transmission then automatically begins implementing the shift. If the currently engaged gear is not disengaged within a preselected time period, because the system cannot achieve a break torque condition, for example, the system signals the driver to manually operate the clutch. A visual and audible signal preferably are provided to the driver. Once the driver manually operates the clutch, the system is able to complete the desired shift.

The various features and advantages of this invention will become apparent to those skilled in the art from the following detailed description of the preferred embodiment. The drawings that accompany the detailed description can be described as follows.

DETAILED DESCRIPTION OF THE PREFERRED EMBODIMENT

Figure 1:
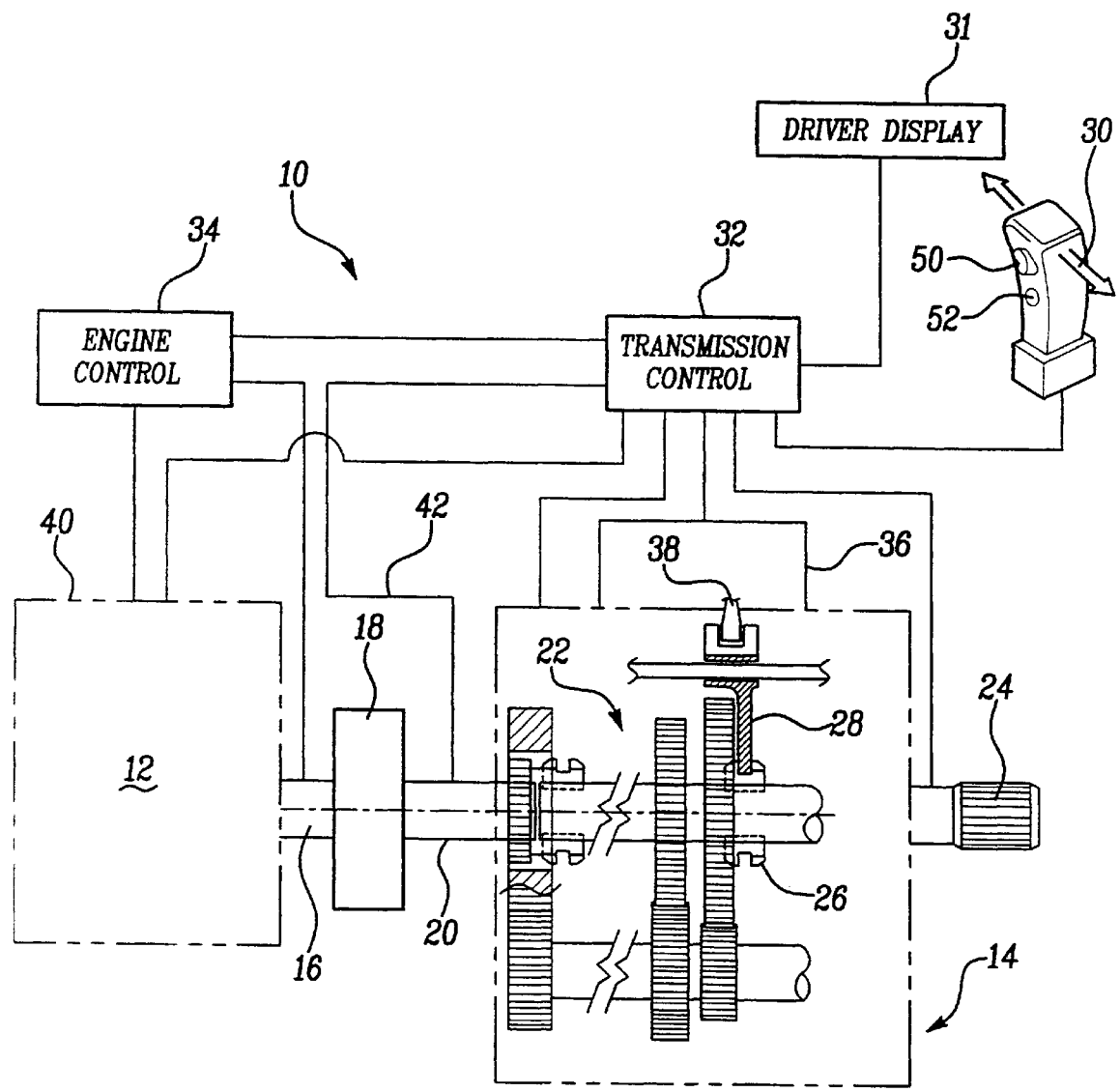
FIG. 1 is a schematic illustration of a vehicle transmission assembly designed according to this invention.

FIG. 1 schematically illustrates a transmission assembly 10. The vehicle engine 12 and the transmission 14 include conventional components unless otherwise indicated. An engine output shaft 16 is connected through a master clutch 18, which is manually operable, to a transmission input shaft 20. When the clutch 18 is open, any rotation of the engine output shaft 16 is not transferred to the transmission input shaft 20. When the clutch 18 is closed, the shafts 18 and 20 are coupled together to rotate generally in unison.

As the transmission input 20 shaft rotates, a gearing arrangement 22 provides a desired driving torque through a transmission output shaft 24. The various gears of the transmission 14 are engaged by moving collars such as the collar 26 through a yoke 28 along conventional shift rails to engage the various gears.

The vehicle operator or driver chooses a desired gear by moving a shift lever 30 in a generally forward or rearward direction. Moving the shift lever 30 in one direction indicates a desire to shift up one or more gears while moving the lever in an opposite direction indicates a desire to shift down one or more gears. The assembly 10 also includes a driver display 31 that communicates the status and operation of the transmission to the driver. The driver display preferably includes such information as a currently engaged gear, whether the transmission can be shifted upward or downward, and various indicators to prompt the driver to take some required action for example. The preferred indicators will be described in context in the following description.

The transmission assembly 10 is semi-automatic in that the driver selects a desired gear by moving the shift lever 30. The assembly 10 then automatically accomplishes that desired shift provided that vehicle operating conditions allow the shift to be accomplished. A transmission control unit 32 and an engine control unit 34 are implemented through conventional microprocessors, for example. Although the transmission control unit 32 and the engine control unit 34 are illustrated separately in FIG. 1, they could be accomplished through a single control module. The transmission control unit 32 receives signals from the shift lever 30 that indicate a desired gear. After determining that conditions are appropriate to effect a desired change, the transmission control unit 32 causes a shifting module 36 to move a moving member 38, which protrudes through the housing of the transmission 14, to move the yoke 28 according to the desired gear change. More details regarding the preferred operation of the transmission control unit 32 and the manner of effecting a desired shift can be found in the United States Patent Application that was filed on May 20, 1996, which has Ser. No. 08/650,749 (U.S. Pat. No. 5,741,202). The teachings of that application are incorporated into this specification by reference.

A variety of vehicle conditions must be accommodated if the driver is to achieve desired vehicle operation. Example conditions that require special considerations include starting the vehicle after it has been stopped and engaging a gear when the system 10 cannot automatically complete a desired shift.

When a driver desires to move the vehicle after it has been at rest, it is necessary to manually operate the clutch 18. In some transmission systems, a specific, dedicated clutch sensor is provided that monitors the position of the clutch pedal to determine whether the clutch is in an open or closed position. The preferred embodiment of this invention determines the status of the clutch by utilizing information that is already available and necessary for other portions of the transmission control. The transmission control unit 32 and the engine control unit 34 utilize information regarding the rotational speeds of the engine output shaft 16 and the transmission input shaft 20. Sensors are schematically illustrated at 40 and 42 for providing the speed information regarding those shafts.

This invention preferably includes the method that is disclosed in the copending U.S. patent application having Ser. No. 08/988,465, which was filed on Dec. 10, 1997.

When the driver desires to move the vehicle after it has been stopped, the driver must first move the lever 30 and subsequently manually operate the clutch to engage a starting gear. The controller 32 monitors the status of the clutch to determine whether it has been manually operated after the signal from the lever 30 is received. If the driver does not manually operate the clutch within a preselected time after indicating a desire to engage a starting gear, the system controller 32 provides an indication to the driver on the driver display 31 that the driver must manually operate the clutch. In one example, the driver display 31 includes an indicator "CL" that is illuminated to notify the driver that the clutch must be manually operated. Preferably, an audible indication is also given to the driver. The system preferably will not engage the starting gear until the driver manually operates the clutch.

While driving, the system automatically completes a desired shift under favorable circumstances. To move the transmission 14 out of a currently engaged gear, a known break torque algorithm is used. Some dithering preferably is provided only when the zero torque load value is approached. The preferred dithering algorithm utilized with this invention is disclosed in the U.S. patent application having Ser. No. 08/955,842 (U.S. Pat. No. 5,980,424), which was filed on Oct. 21, 1997. The disclosure of that application is incorporated into this specification by reference.

Under some conditions, the zero torque algorithm will not achieve a zero torque condition. Since the shift lever 30 is not manually connected to the transmission 14, there is no ability for the driver to "strong arm" the transmission 14 out of gear, which is sometimes accomplished in a conventional manual transmission. This invention includes providing the driver with an indicator on the driver display 31 that communicates the inability to achieve zero torque to the driver. In one example, the illuminated "CL" indicator is utilized to tell the driver to manually operate a clutch pedal (not illustrated), which will assist the system in achieving zero torque so that the currently engaged gear can be disengaged and neutral can be obtained. The system controller 32 relies upon conventional position sensors that determine the positions of the gear members within the transmission 14. The controller 32 preferably monitors the condition of the transmission 14 after a shift request is received from the driver. If the transmission 14 does not leave the engaged gear within a preselected time period, the controller 32 provides the indication to the driver through the display 31. Once the driver responds, by lightly bumping the clutch pedal, for example, the transmission 14 can be moved into neutral and complete the shift as desired.

Example conditions where the automatic break torque algorithm may not achieve zero torque include when the vehicle is moving uphill and/or carrying a heavy load. Another example condition is when the idle speed of the engine has already been reached, then the system will not be able to achieve zero torque. Yet another example is during a heavy breaking application, when the driver attempts to make a shift, break torque may not be available. Under all of these circumstances, when break torque is not automatically achieved, the system preferably provides the indication to the driver on the display 31 with an audible signal prompting the driver to lightly bump the clutch pedal so that break torque can be achieved.

Figure 2:
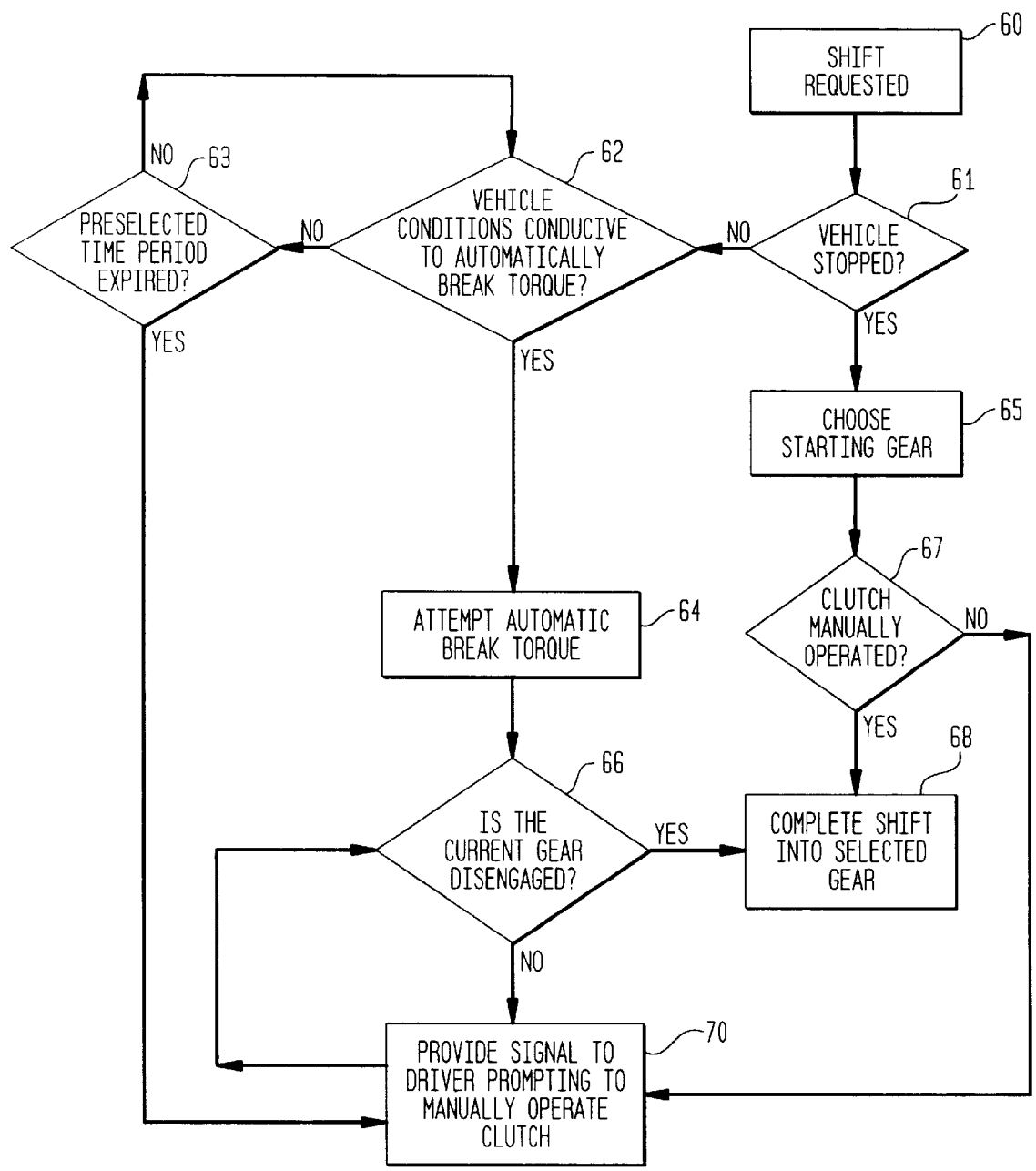
FIG. 2 is a flow chart diagram illustrating a control method of this invention.

The method of providing the driver with a signal indicating that manual clutch operation is required to complete a desired shift is summarized in FIG. 2. When the driver requests a shift at 60, the controller 32 preferably first determines whether the vehicle is stopped at 61. If the vehicle is not stopped, the controller 32 preferably is programmed to immediately prompt the driver to manually operate the clutch to facilitate achieving the desired shift when the necessary condition therefor has not been established within a preselected time period at 63. If the vehicle conditions appear conducive to automatically breaking torque, the system attempts to automatically achieve zero torque at 64. The controller 32 preferably determines whether the currently engaged gear has been disengaged at 66. If the currently engaged gear has not been disengaged, the controller 32 interprets that as meaning that zero torque cannot be achieved. The driver display 31 then provides the signal to the driver at 70 to prompt the driver to manually operate the clutch 18 so that the desired shift can be achieved. The controller 32 preferably continues to monitor whether the current gear has been disengaged and continues to prompt the driver to manually operate the clutch until the transmission 14 is moved into neutral so that the desired shift can be completed. Once the current gear is disengaged, the system automatically completes the desired shift at 63.

If it was detected that the vehicle was initially stopped at 61, the requested shift at 60 is interpreted as a desire to shift the transmission 14 into a starting gear at 65. At 67 it is determined whether the clutch 18 has been manually operated. If the clutch is operated, the system automatically completes the desired shift at 68. Otherwise, the system prompts the driver to manually operate the clutch at 70.

The preceding description is by way of example rather than limiting in nature. Variations and modifications to the disclosed embodiment may become apparent to those skilled in the art that do not necessarily depart from the purview and spirit of this invention. Accordingly, the legal scope of protection given this invention can only be determined by studying the following claims.

What is claimed is:

1. A method of controlling a vehicle drive system including an engine, a manually operable clutch, a transmission that has a plurality of selectively engageable gears and that is coupled to the engine through the clutch, and an automated shift module that changes the gears within the transmission, comprising the steps of:

(A) generating a signal to indicate an operator-desired shift of the transmission;

(B) automatically initiating the desired shift including automatically causing a break torque condition without requiring manual clutch operation;

(C) determining whether a transmission condition necessary to complete the desired shift has been automatically established by the system within a preselected time period; and (D) signaling the operator of the vehicle to manually operate the clutch to cause the break torque condition and thereby complete the desired shift when the necessary transmission condition has not been automatically established within the preselected time period.

2. The method of claim 1, wherein step (D) includes providing a visible signal to the operator indicating that the operator must manually operate the clutch to complete the desired shift.

3. The method of claim 1, wherein step (D) includes providing an audible signal to the operator indicating that the operator must manually operate the clutch to complete the desired shift.

4. The method of claim 1, wherein step (B) includes automatically breaking torque between the engine and the transmission to enable the transmission to be moved into neutral.

5. The method of claim 1, wherein step (C) includes determining whether a currently engaged gear has been disengaged.

6. The method of claim 1, wherein the vehicle is initially stopped and step (A) includes indicating a desire to shift the transmission into a starting gear.

7. The method of claim 6, wherein step (C) includes determining whether the clutch has been manually operated.

* * * * *